(12) United States Patent
Liao et al.

(10) Patent No.: US 8,948,697 B2
(45) Date of Patent: Feb. 3, 2015

(54) WIRELESS OBTAINING METHOD FOR EXTERNAL DATA, ELECTRONIC APPARATUS AND APPLICATION PROGRAM

(71) Applicant: Yuekang HealthCare Management Consultants, Inc., Tainan (TW)

(72) Inventors: Shiu-Min Liao, Tainan (TW); Chun-Lin Juan, Tainan (TW)

(73) Assignee: Yuekang Healthcare Management Consultants, Inc., Tainan (TW)

( * ) Notice: Subject to any disclaimer, the term of this patent is extended or adjusted under 35 U.S.C. 154(b) by 210 days.

(21) Appl. No.: 13/666,188

(22) Filed: Nov. 1, 2012

(65) Prior Publication Data

US 2013/0115881 A1 May 9, 2013

(30) Foreign Application Priority Data

Nov. 3, 2011 (TW) .............................. 100140067 A
Jun. 29, 2012 (TW) .............................. 101123556 A

(51) Int. Cl.
*H04B 7/00* (2006.01)
*H04W 4/00* (2009.01)
*H04W 84/18* (2009.01)

(52) U.S. Cl.
CPC .............. *H04W 4/008* (2013.01); *H04W 84/18* (2013.01)
USPC ...................................................... 455/41.2

(58) Field of Classification Search
CPC ........................... H04W 84/18; H04M 1/7253
USPC ........................................ 455/41.2, 410, 411
See application file for complete search history.

(56) References Cited

U.S. PATENT DOCUMENTS

2005/0266798 A1* 12/2005 Moloney et al. ............. 455/41.2
2009/0265470 A1* 10/2009 Shen et al. .................... 709/227
2009/0327713 A1* 12/2009 Marin et al. .................. 713/168

FOREIGN PATENT DOCUMENTS

| CN | 1638383 A | 7/2005 |
| CN | 101843124 A | 9/2010 |
| CN | 102170349 A | 8/2011 |
| EP | 1551140 A1 | 6/2005 |
| TW | 200809625 A | 2/2008 |
| TW | M422955 U1 | 2/2012 |
| TW | M423883 U1 | 3/2012 |

OTHER PUBLICATIONS

Taiwan Official Action issued on Apr. 29, 2014.
(Continued)

*Primary Examiner* — April G Gonzales
(74) *Attorney, Agent, or Firm* — Chun-Ming Shih; HDLS IPR Services

(57) ABSTRACT

A wireless method for obtaining external data is comprised of an electronic apparatus, an external message and an external apparatus. The electronic apparatus reads an external message without physical contact and identifies a Media Access Control (MAC) Address of an external apparatus in accordance with the contactless message. The electronic apparatus establishes a wireless connection with the external apparatus directly using the identified MAC Address, and obtains necessary data from the external apparatus through the wireless connection. Therefore this wireless method circumvents the hassle for user to turn on and off a Bluetooth transmitting component of the electronic apparatus, select a connecting target, and establish the wireless connection with the external apparatus manually all together.

19 Claims, 16 Drawing Sheets

(56) References Cited

OTHER PUBLICATIONS

Official Action issued by European Patent Office on Mar. 21, 2013.
IBM Technical Disclosure Bulletin.
"Security system for children on school route" by Atsushi Ito et al. abstracted from KDDI R&D Laboratories, Tokyo, Japan and Hiroshima City University, Hiroshima, Japan.
China Official Action issued on Jun. 17, 2014.

* cited by examiner

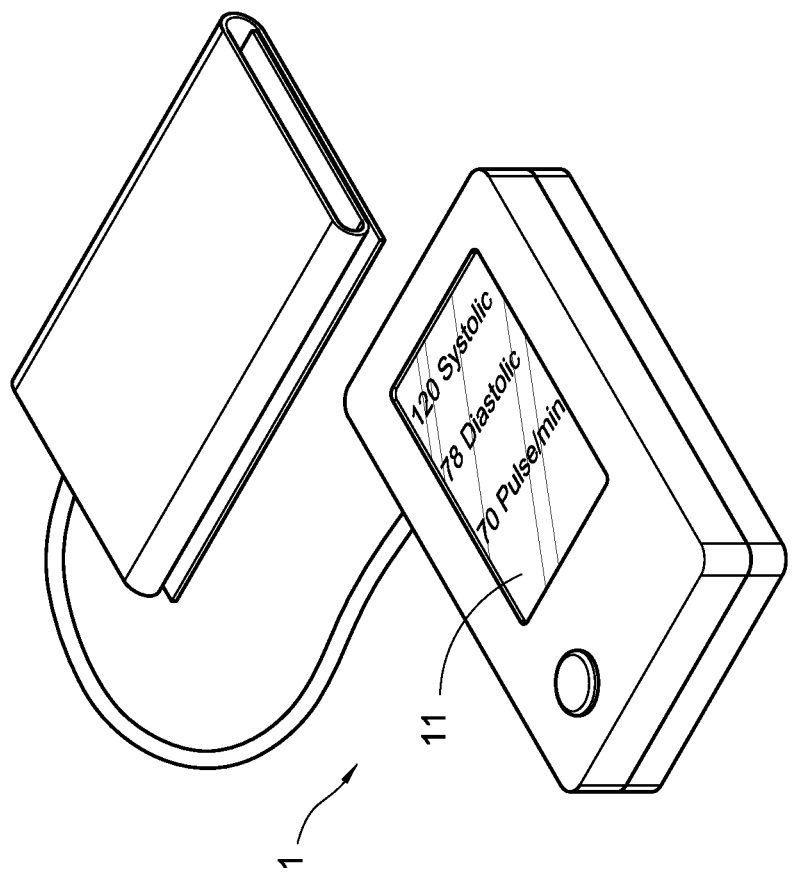
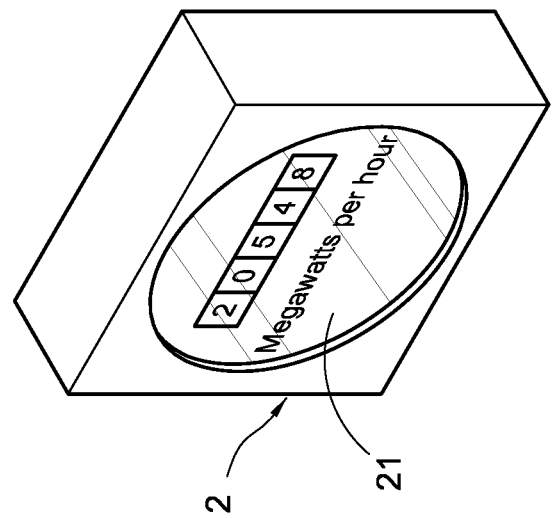
FIG.1B
(Related art)
FIG.1A
(Related art)

WIRELESS OBTAINING METHOD FOR EXTERNAL DATA, ELECTRONIC APPARATUS AND APPLICATION PROGRAM

This application is based on and claims the benefit of Taiwan Application No. 100140067 filed Nov. 3, 2011 and Taiwan Application No. 101123556 filed Jun. 29, 2012, the entire disclosure of which is incorporated by reference herein.

BACKGROUND OF THE INVENTION

1. Field of the Invention

This invention involves a method of procurement, especially regarding the method which enables an electronic apparatus to automatically establish Bluetooth connectivity and wirelessly obtaining external data.

2. Description of the Related Art

There are many different electronic apparatus on the market that can assist users to measure and record data. In FIG. 1A and FIG. 1B are examples of the blood pressure machine and electric meter of related art.

Generally, blood pressure machine 1 is used to assist users to measure the systolic blood pressure, diastolic blood pressure, and pulse, etc., and the measured values would be shown on a display screen 11 of the blood pressure machine 1. The user can see the measured values from the display screen 11 and to write it down for record. Electric meter 2 is to measure the total electricity usage of the user's home, and the measured value will be shown on a meter readout 21. Using the meter readout 21 the user can know the current electric usage amount, and electric utility employee can calculate the electric fee based on the value.

Take the blood pressure machine 1 for example, after the medical staff uses the blood press machine 1 to take blood pressure for the patient in the hospital, staff would record manually the measured value onto the patient chart. As your can see, there could be hand written mistake, human error introduced. Furthermore, if more than one blood pressure machine 1 is used simultaneously to concurrently measure multiple patients at same time, this increases the chance of higher likelihood of hand written mistakes.

In recent years there are many new types of measuring tools on the market, for example the blood pressure machine 1 would have embedded Bluetooth connectivity capability. Hence, after the medical staff uses the blood pressure machine 1 to take blood pressure reading from the patient, a mobile apparatus such as Personal Digital Assistant (PDA) can be used to establish Bluetooth connection to the blood pressure machine 1 and obtain the blood pressure data wirelessly with the blood pressure machine 1. In this way human errors can be avoided.

However, it's not an easy task to establish Bluetooth connection between two apparatus, as it incorporates the following steps: 1. User needs to manually activate Bluetooth transfer capability on the PDA; 2. User needs to broadcast the PDA's Bluetooth signal to search the surrounding area for Bluetooth capable apparatus; 3. PDA will show a list of connectable Bluetooth apparatus in the area for user to choose from; 4. User must identify the target blood pressure machine 1's apparatus name or serial number and select it to make connection; 5. PDA will make Bluetooth connection with the selected blood pressure machine 1; 6. Once Bluetooth connection is established successfully, PDA will retrieve the blood pressure data from the blood pressure machine 1; 7. User will fill in the retrieved data into a corresponding field on the PDA.

From the above description, there are many troublesome and manual steps the users must take to make a Bluetooth connection. Furthermore, if the medical staff has multiple units of the same brand and model of the blood pressure machine and simultaneously in use to take blood pressure readings from different patients, when the PDA is searching for nearby Bluetooth apparatus, there will be multiple identical model name or serial number shown in the list. This would cause selection error and recording error as medical staff would have difficult time identifying correctly which target on the PDA's list correspond to the actual blood pressure machine. As such, using the above method to obtain the Bluetooth data will result in user annoyance.

There should be a new method and an apparatus using the new method that will enable the user to retrieve external data via Bluetooth easily, minimize complicated manual steps, and also to avoid human and apparatus selection errors.

SUMMARY OF THE INVENTION

The purpose of this invention comprises of a wireless method for obtaining external data, electronic apparatus and its software application. The method allows the electronic apparatus to quickly and automatically establish Bluetooth connectivity with an external apparatus, and wirelessly transfer data from the external apparatus.

To achieve the above goal, this invention employs a wireless method to obtain external message by an electronic apparatus, the external message is used to identify a Media Access Control Address (MAC Address) of the external device. Then the electronic apparatus automatically establish Bluetooth connection with the external device using the MAC Address and obtains the data wirelessly from the external device.

Comparing to the related art, this invention is more efficient, allowing user to quickly obtain data from external device wirelessly via Bluetooth and does not require pen and paper for recording and avoids human error in the process.

Furthermore, when the user operates the electronic apparatus to obtain data from external device via Bluetooth wirelessly, user does not need to manually turn on the Bluetooth transfer on the electronic apparatus nor needing to search through myriads of Bluetooth enabled devices in the surrounding area for the correct external device. This method will minimize operation steps and operation time required for the procedure, and can also eliminate human errors caused by manual operation.

BRIEF DESCRIPTION OF THE DRAWINGS

FIG. 1A illustrates the blood pressure machine of related art

FIG. 1B illustrates the electric meter of related art

DETAIL DESCRIPTION OF THE INVENTION

Figure 2:
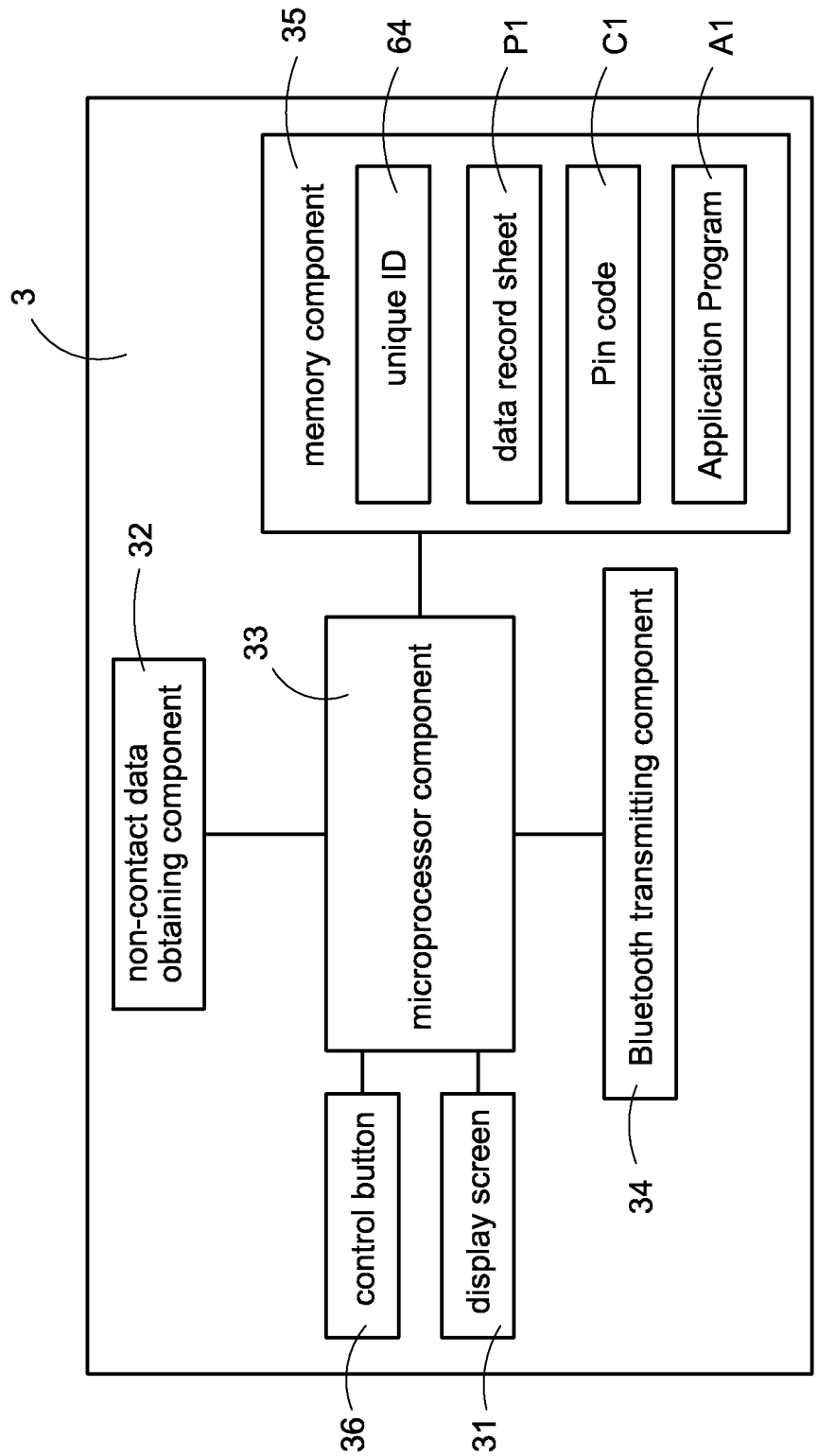
FIG. 2 illustrates a preferred embodiment of the invention.

Referring now to the drawings illustrating a preferred embodiment of the invention, detailed description as follows:

Please refer to FIG. 2 which illustrates a preferred embodiment of the invention. The invention mainly comprises of an electronic apparatus 3 that utilizes its application program A1 to wirelessly obtain data from external device; the electronic apparatus 3 itself comprises of a display screen 31, a non-contact data obtaining component 32, a microprocessor component 33, a Bluetooth transmitting component 34, and a memory component 35. The microprocessor component 33 is electronically connected to the display screen 31, the non-contact data obtaining component 32, the Bluetooth transmitting component 34, and the memory component 35, and the application program A1 resides in the memory component 35.

The non-contact data obtaining component 32 primarily employ non-contact method to obtain external data (e.g. External message 51~56 as illustrated in FIG. 5 to FIG. 9 will be explained below using the external message 51 as example). Its worth mentioning that the electronic apparatus 3 can have at least one control button 36 electronically connected to the microprocessor component 33 allowing the user to press on the control button 36 to activate the non-contact data obtaining component 32 to obtain the external message 51. Or the non-contact data obtaining component 32 can be configured to start automatically when the application program A1 is running, and the non-contact data obtaining component 32 set to run as a background process. As such, the user will not need to manually press the control button 36 to start the non-contact data obtaining component 32. In addition, in this embodiment, the display screen 31 can be of touch screen type so the control button 36 function can be combined onto the display screen 31, but not limited thereto.

Figure 5:
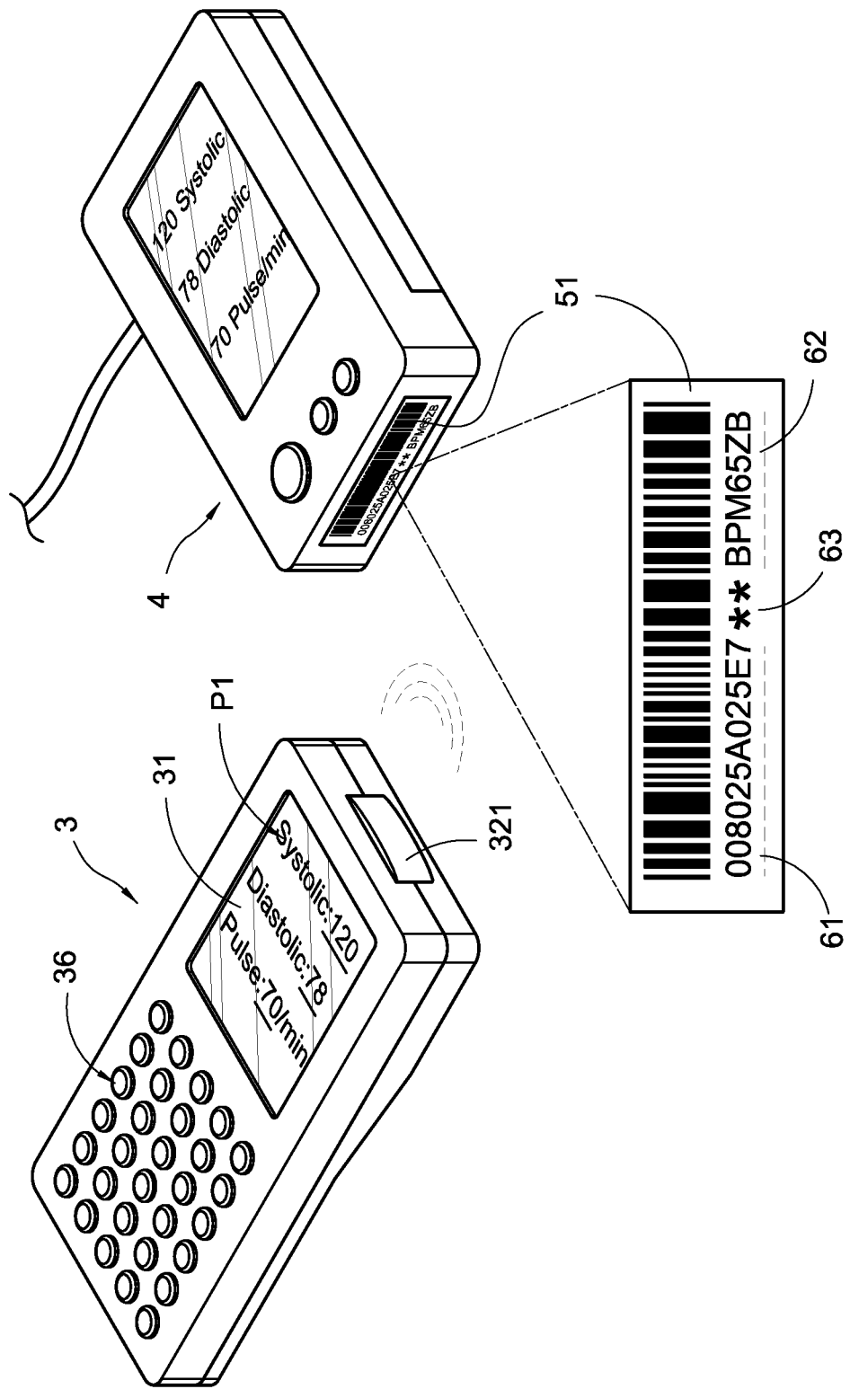
FIG. 5 illustrates the preferred embodiment of the external message obtaining process.

After the external message 51 is obtained, it will be sent to the microprocessor component 33, the microprocessor component 33 will determine if the external message 51 contains an external device (example of external device 4 as shown in FIG. 5) Media Access Control Address (MAC Address) (example of MAC address 61 as shown in FIG. 5).

The Bluetooth transmitting component 34 will provide the electronic apparatus 3 with a type of wireless transfer capability. Once the microprocessor component 33 successfully received the MAC Address 61 (more specifically the MAC Address of a Bluetooth transmitting component of the external device 4) of the external device 4 via the external message 51, the microprocessor component 33 will activate the Bluetooth transmitting component 34 and automatically establish Bluetooth connection with the external device 4 in accordance with the obtained MAC Address 61. The benefit of this method is to only establish pairing with the known MAC Address 61. The electronic apparatus 3 will only establish Bluetooth pairing connection with the owner of said MAC Address 61 and not search nearby area for connectable Bluetooth devices that user must manually choose from. In other words, the electronic apparatus 3 will know the external device 4 is the target to make Bluetooth connection with, thus user does not need to manually perform selection and settings procedure, and this will greatly minimize the time required for establishing Bluetooth connection.

Primarily this invention is using Bluetooth connectivity as an embodiment, however as long as the transmission and connectivity method can be quickly performed between two devices using this invention's method, would be inclusive and not limited thereof. For example, as long as the external message 51 contains the MAC Address 61 of the said external device 4 and the electronic apparatus 3 obtains the MAC Address 61 of the external device 4, then a direct connection can be made with the external device 4 via ZigBee or WiFi direct or any other transmission protocol without the need to survey all of the surrounding devices and to find the matching target device.

The memory component 35 can store at least one data record sheet P1 and shown on the display screen 31 and the data record sheet P1 mainly comprise of data fields relevant to the data obtained from the external device 4 (explained in the following sections). After the electronic apparatus 3 establish Bluetooth connection with the external device 4, electronic apparatus 3 will automatically obtain necessary data from the external device 4, and the microprocessor component 33 will determine base on the type of device of the external device 4 to open the corresponding data record sheet P1 and fill in the data into a corresponding data field of the data record sheet P1. This will minimize the amount of manual entry of data by the user and thus avoid human errors.

Figure 3A:
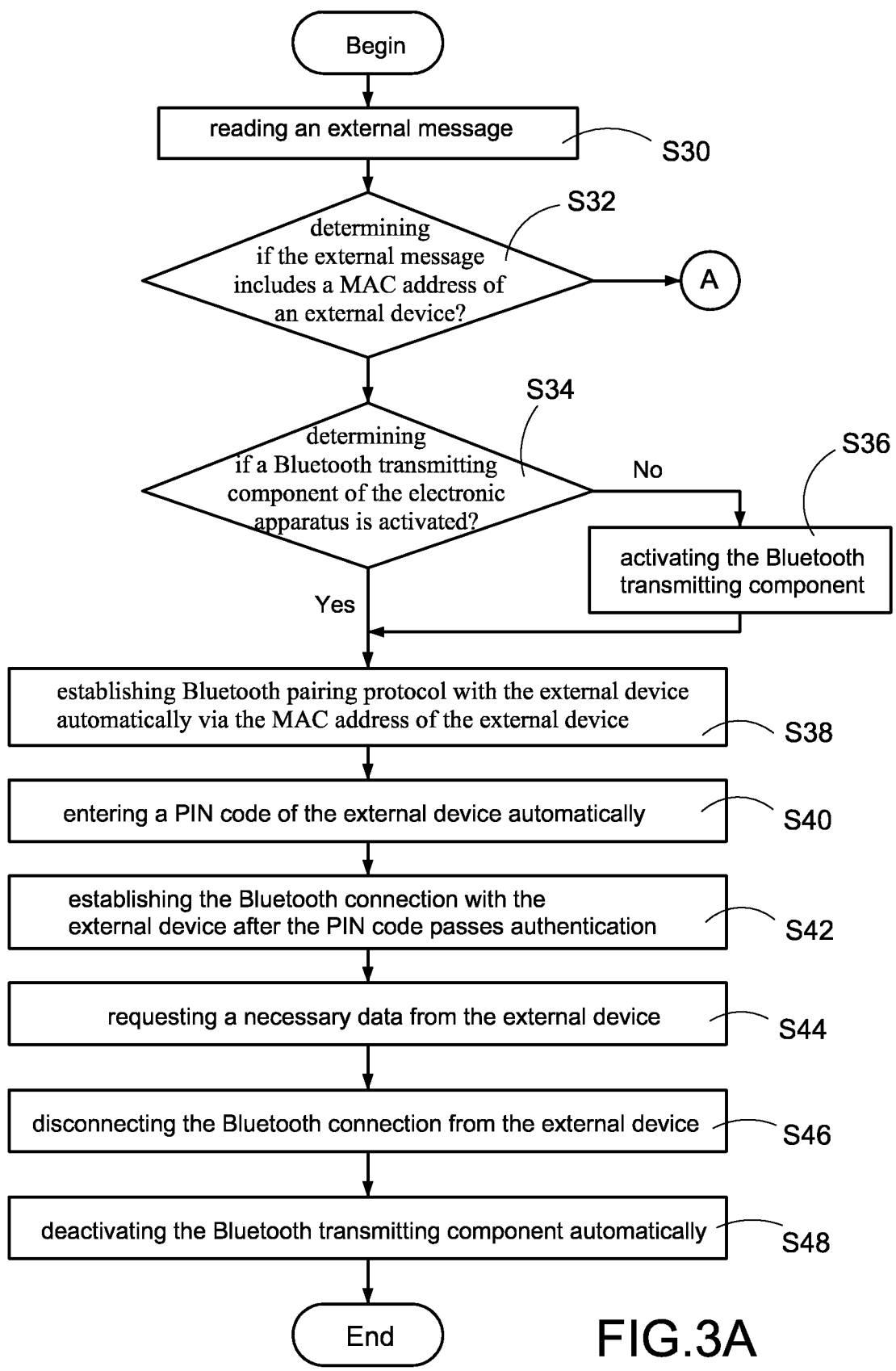
FIG. 3A illustrates a preferred embodiment of the connection process

Please now refer to FIG. 3A illustrating a preferred embodiment of the connection process. Firstly, the electronic apparatus 3 uses the non-contact data obtaining component 32 to obtain the external message 51 non-contact wirelessly (step S30), then the microprocessor component 33 will determine if the external message 51 contains the MAC Address 61 of the external device 4 (step S32).

Please also refer to FIG. 5 illustrating a preferred embodiment of the external message obtaining process. In this embodiment the non-contact data obtaining component 32 can be a barcode component 321, and the external message 51 contains barcode data of the MAC Address 61 of the external device 4. More specifically, in this embodiment, the external message 51 is barcode data comprised of the MAC Address 61 of the external device 4 and a Model Code 62, wherein, the model code 62 is used to determine the type of the external device 4 by the electronic apparatus 3 (explained in following section). The above mentioned steps S30 and S32 refer to the barcode component 321 obtaining the barcode data and determine if the content of the barcode data contains the MAC Address 61 of the external device 4. The barcode data can be attached to the surface of outer shell of the external device 4, or shown on the display screen of the external device 4 (not in the figure), but not limited thereof.

The electronic apparatus 3 can also have a light emitting component (not in the figure), for example a flash light, when the electronic apparatus 3 determines that data obtainment failed is due to insufficient environment lighting, the electronic apparatus 3 can automatically activate the light emitting component for light compensation to improve data obtaining success rate. For example, if the nursing staff needs to obtain the data from the patient's blood pressure machine while the patient is sound asleep in the dark room, this will render the electronic apparatus 3 not able to successfully obtain the external message 51 on the blood pressure machine due to lack of ambient light, thus the electronic apparatus 3 can automatically activate the light emitting component as light compensation via the method as described earlier.

Figure 6:
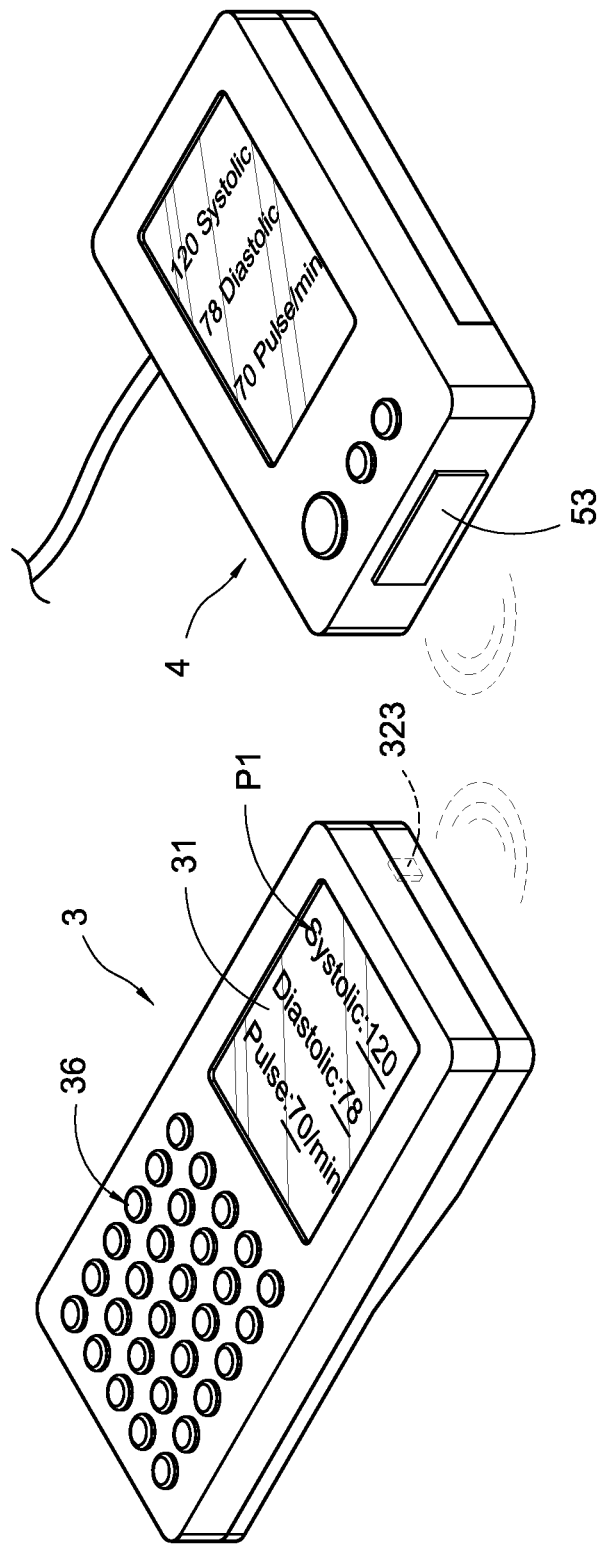
FIG. 6 illustrates the second embodiment of the external message obtaining process.

Please also refer to FIG. 6, illustrating a second embodiment of the external message obtaining process. In this embodiment, the non-contact data obtaining component 32 can be of a Radio Frequency (RF) component 323, the external message 53 can be stored within a RFID tag, and this external message 53 is comprised of the MAC Address 61 of the external device 4 and the Model Code 62. The RFID tag can be placed anywhere within the external device 4, or attached to the outer surface of the external device 4, and not limited thereof.

The RF component 323 can be activated once the internal application program A1 stored in the electronic apparatus 3 is running, and can continually emit RF signals to search for any RFID tag nearby the electronic apparatus 3. When the user places the electronic apparatus 3 nearby the outer surface of external device 4, the RF component 323 can detect the RFID tag, and establish connection to obtain the external message 53 that is stored within the RFID tag. It's worth mentioning that if data obtainment is processed via the RF component method, this embodiment will not encounter the problem of insufficient ambient lighting issue causing data obtainment failure which requires activation of light emitting component for light compensation, as this RF method is more convenient.

Comparing with Bluetooth technology, RF is a short range transmission technology, the transmitting range is much shorter, thus even when the RF component 323 is continuously operating, while there are many external devices 4 that is nearby the electronic apparatus 3, as long as the distance is not close enough the RF component 323 will not be able to obtain the RFID tag, hence there is no need to worry if the wrong device data is being obtained or repeated data obtained. Moreover, any short range non-contact wireless transmission technology can be used as a method described by this invention, for example Near Field Communication (NFC) or ZigBee, etc. This invention merely uses the RF technology as an embodiment, thus the scope of this patent is not limited thereof.

Figure 7:
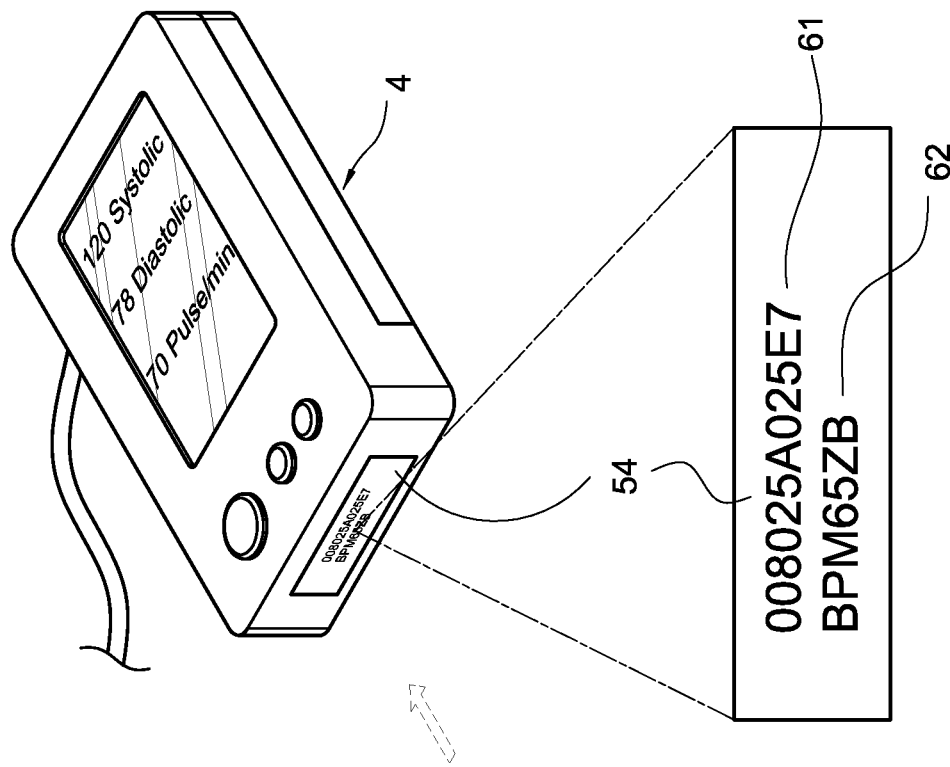
FIG. 7 illustrates the third embodiment of the external message obtaining process.
Figure 7:
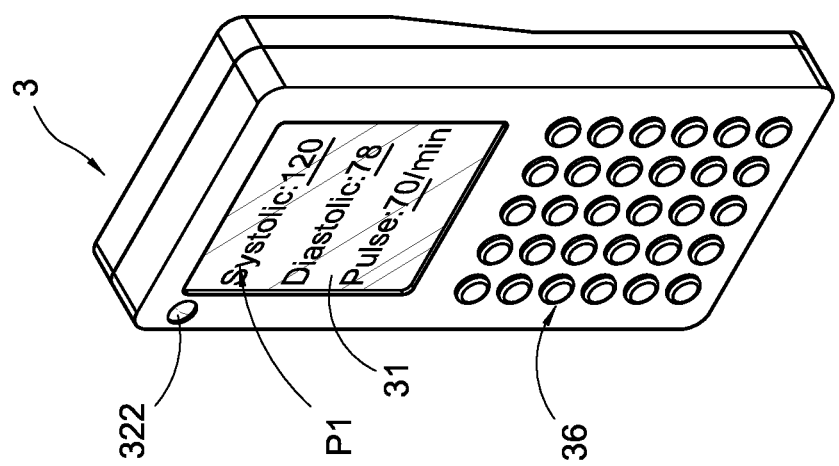

Please refer to FIG. 7, illustrating a third embodiment of the external message obtaining process. In this embodiment, the non-contact data obtaining component 32 as a camera component 322, the external message 54 primarily as text or graphic image, not limited thereof. From step S30, the electronic apparatus 3 utilizes the camera component 322 to obtain the external message 54 (obtaining the text or graphic message image) and transfer the data to the microprocessor component 33. Then in step S32, the microprocessor component 33 will decode the text and or the graphic image of the external message 54, obtaining the message within the external message 54, and determines if the external message 54 contains the MAC Address 61 of the external device 4.

From the embodiment shown as FIG. 7, the external message 54 comprises of the MAC Address 61 of the external device 4 and the Model Code 62, hence when the microprocessor component 33 decodes the text and or the graphic image, it will obtain the MAC Address 61 of the external device 4 and the Model Code 62.

Figure 8:
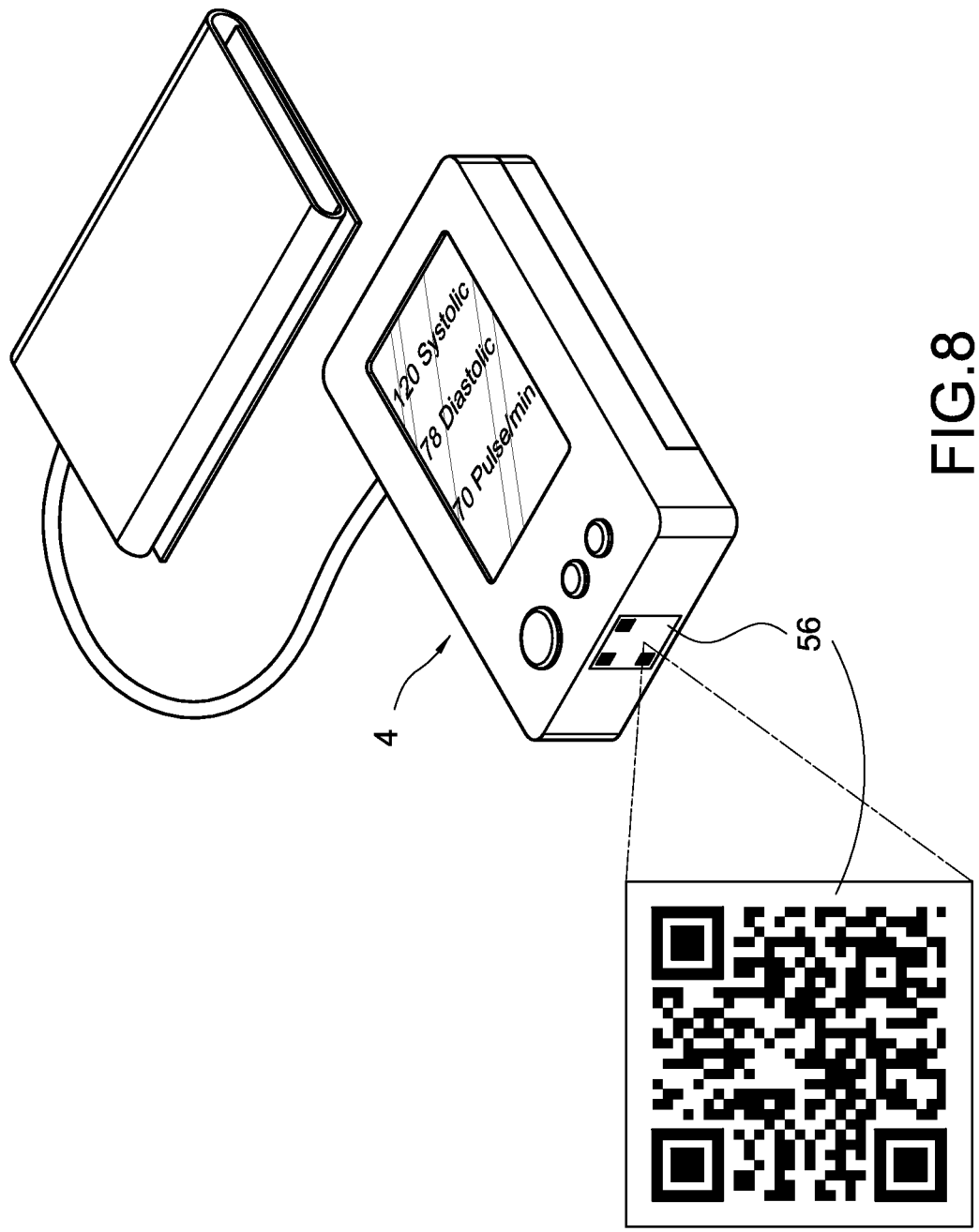
FIG. 8 illustrates the fourth embodiment of the external message obtaining process.

Please refer to FIG. 8, illustrating a forth embodiment of the external message obtaining process. In this embodiment, the non-contact data obtaining component 32 is a camera component 322. The external message 56 primarily comprised of the MAC Address 61 of the external device 4 and the Model Code 62, which will be referred to as the QR code. In the step S30, the electronic apparatus 3 utilizes the camera component 322 to obtain the QR code, and transmit the data of the QR code to the microprocessor component 33. In step S32, the microprocessor component 33 will determine from the QR code whether the QR code contains the MAC Address 61 of the external device 4.

Figure 9:
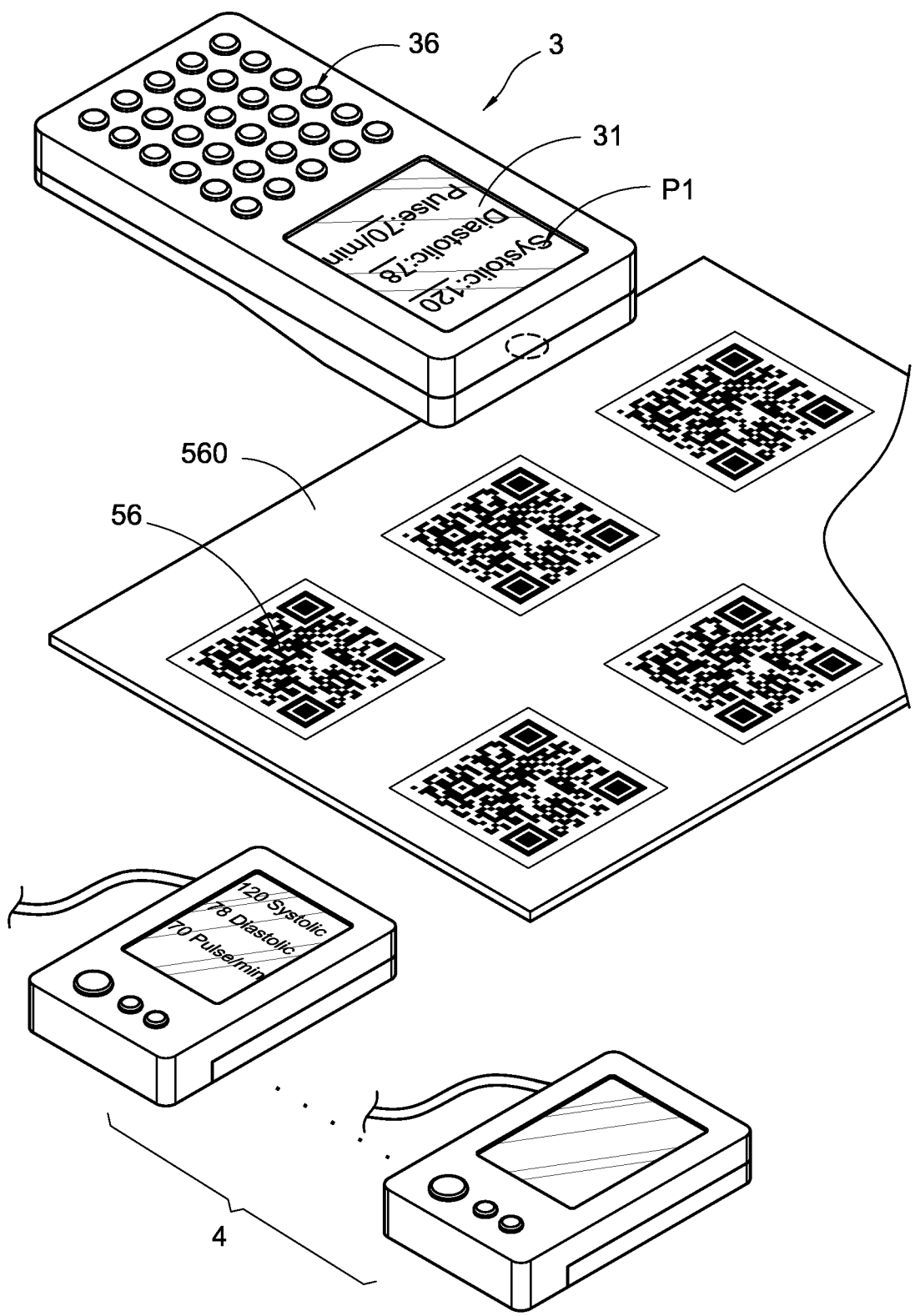
FIG. 9 illustrates the fifth embodiment of the external message obtaining process.

It's worth mentioning that as long as the external device 4 is within the Bluetooth connectable range of the electronic apparatus 3, it can establish connection with electronic apparatus 3, thus the external message 51~56 may not need to be attached to the outer surface of the external device 4. FIG. 9 illustrates the fifth embodiment of the external message obtaining process. For example, nursing staff in the hospital can carry an information board 560, and the information board 560 can attach many external messages (FIG. 9 shows the external message 56 as example), and each external message 56 contains different MAC Address of individual external device 4. Hence when nursing staff needs to obtain the data from a first external device, staff only needs to use the electronic apparatus 3 to obtain the external message 56 on the information board 560 which corresponds to the first external device and no need to look for the physical external device itself (the external device could be on the desk, on the bed, in the drawer or on the nursing cart, etc.). This will increase the convenience for the nursing staff and reduce work time and the work load.

In the embodiment illustrated by FIG. 7, FIG. 8, and FIG. 9, the electronic apparatus 3 can be equipped with above mentioned light emitting component (fig not shown), the electronic apparatus 3 can automatically activate the light emitting component for ambient light compensation to improve the success rate of message recognition by the camera component 322 when the electronic apparatus 3 determines that ambient light is not sufficient for the camera component 322 to focus properly.

Back to FIG. 3A, after step S32, if the microprocessor component 33 determines the external message 51 contains the MAC Address 61 of the external device 4 then the microprocessor component 33 will determine if the Bluetooth transmitting component 34 is activated (Step S34) on the electronic apparatus 3. If the Bluetooth transmitting component 34 is not activated, the Bluetooth transmitting component 34 will be activated (step S36). However the Bluetooth transmitting component 34 can be set to be activated by default on the electronic apparatus 3, hence steps S34 and S36 may be skipped and not limited thereof.

After confirming Bluetooth transmitting component 34 is activated, the microprocessor component 33 can control the Bluetooth transmitting component 34 to establish direct Bluetooth connection via the MAC Address 61 from the external message 51 to the external device 4. More specifically, the Bluetooth transmitting component 34 establishes Bluetooth pairing protocol with the external device 4 (step S38) via the MAC Address 61 and automatically enter a PIN code C1 of the external device 4 (step S40) once Bluetooth pairing protocol is initiated. The PIN code C1 can be stored beforehand in the memory component 35 allowing electronic apparatus 3 to enter the PIN code C1 during the pairing process without manual user intervention. Once the PIN code C1 passes authentication, the electronic apparatus 3 will establish successful Bluetooth connection with the external device 4 (step S42).

After electronic apparatus 3 establishes Bluetooth connection with the external device 4, electronic apparatus 3 will request the necessary data from external device 4 (step S44). Once the electronic apparatus 3 receives the necessary data from external device 4, the electronic apparatus 3 will disconnect the Bluetooth connection with the external device 4 (step S46) and automatically deactivate the Bluetooth transmitting component 34 function (step S48) on the electronic apparatus 3. The benefit here is once the electronic apparatus 3 has completed the task it can be used again to connect to another device's MAC address to quickly establish Bluetooth connection, and steps S46 and S48 may not need to be executed, but not limited thereof.

Figure 3B:
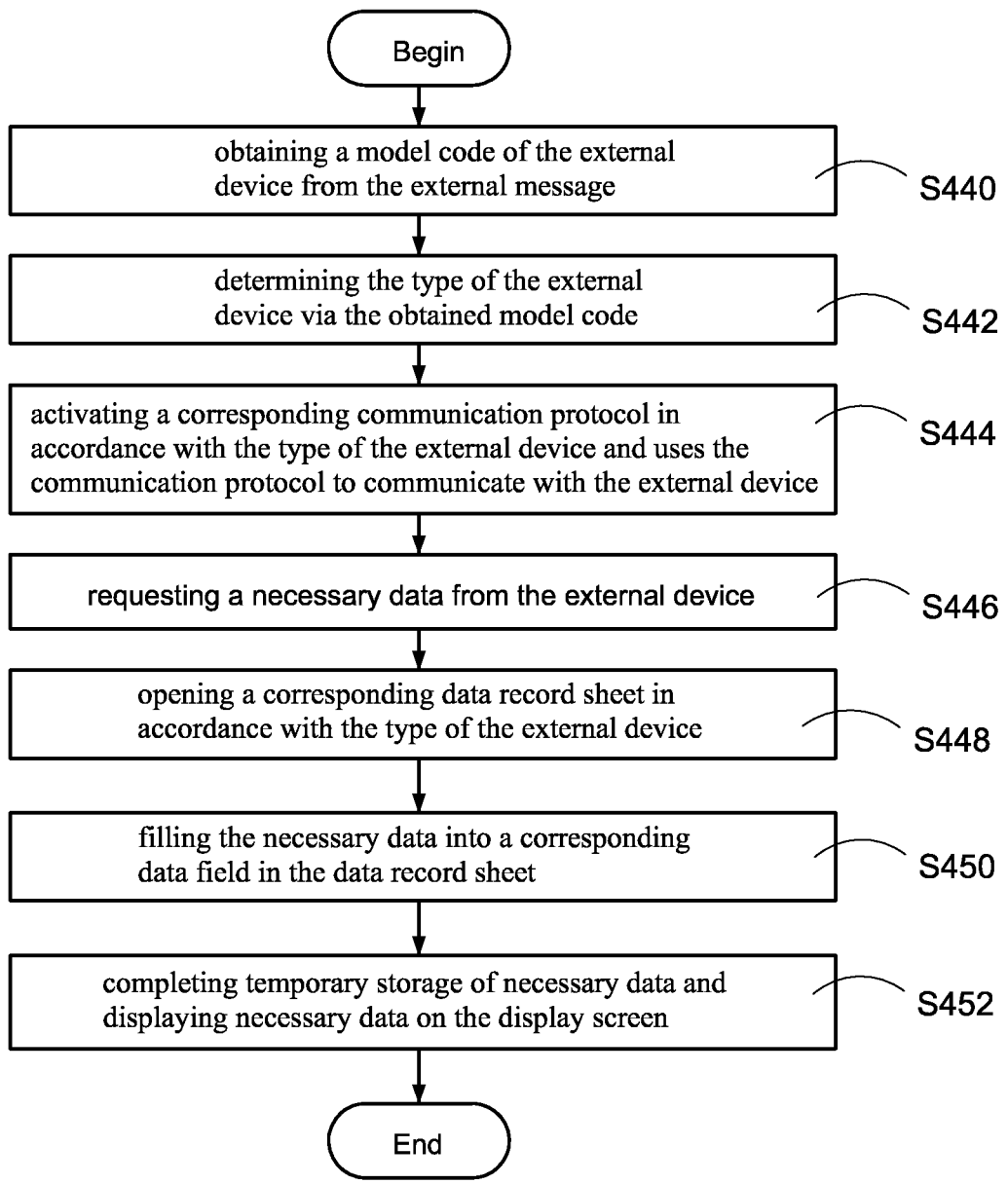
FIG. 3B illustrates the preferred embodiment of the data transmission process.

Please refer to FIG. 3B illustrating the embodiment of the data transmission process. As described above, when the electronic apparatus 3 establishes Bluetooth connection with the external device 4 in step S42, the electronic apparatus 3 must first obtain the model code 62 of the external device 4 from the external message 51 before the electronic apparatus 3 can obtain the data from the external device 4 (step S440). The microprocessor component 33 can then determine the type of the external device 4 by the model code 62 (step S442). More specifically, the model code 62 is used to differentiate the type of the external device 4, i.e. blood pressure machine, blood glucose machine, weigh scale, or thermometer, etc. Once the electronic apparatus 3 determines the type of the external device 4, the electronic apparatus 3 will activate a corresponding communication protocol to establish connection with the external device 4 (step S444). As such, the electronic apparatus 3 uses the corresponding communication protocol that the external device 4 can understand then the necessary data can be obtained from the external device 4 (step S446).

According to the type of the external device 4, the microprocessor component 33 opens the data record sheet P1 (step S448) and fills in the obtained data into the corresponding data field (step S450). The electronic apparatus 3 will have completed the temporary storage procedure after completing step S450 and will display the data on the display screen 31 (step S452). The electronic apparatus 3 may obtain more than one data record at one time and not limited thereof.

Figure 4B:
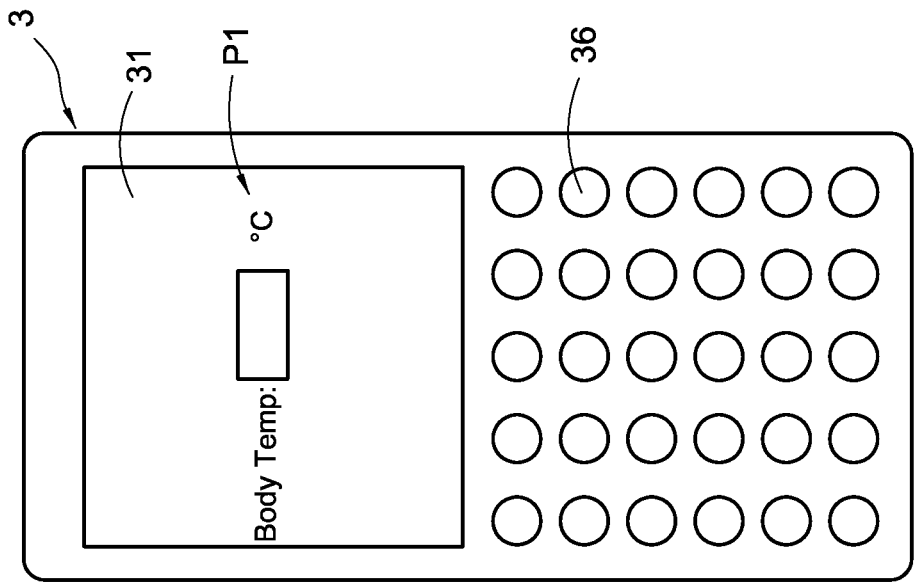
FIG. 4B illustrates the second embodiment of the data record sheet
Figure 4A:
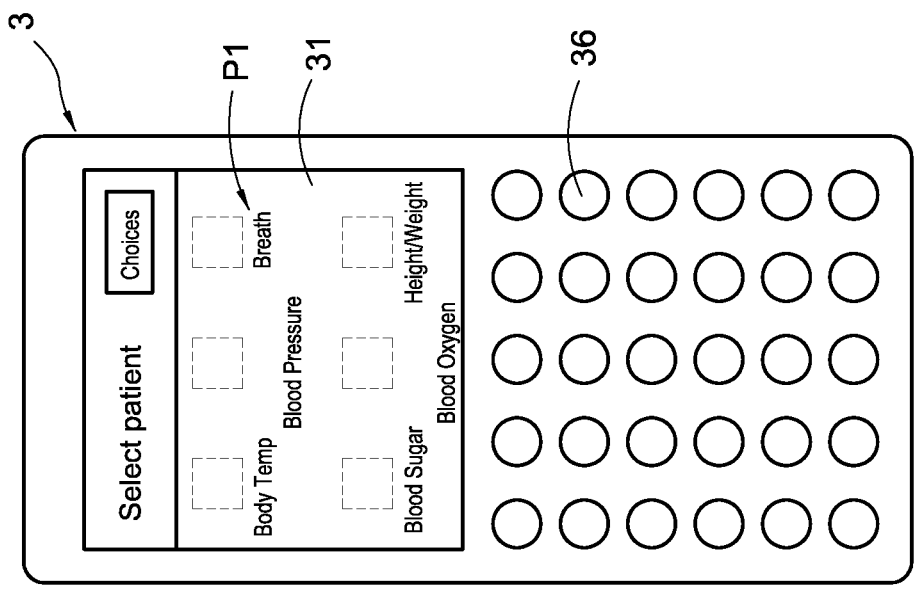
FIG. 4A illustrates the preferred embodiment of the data record sheet
Figure 4D:
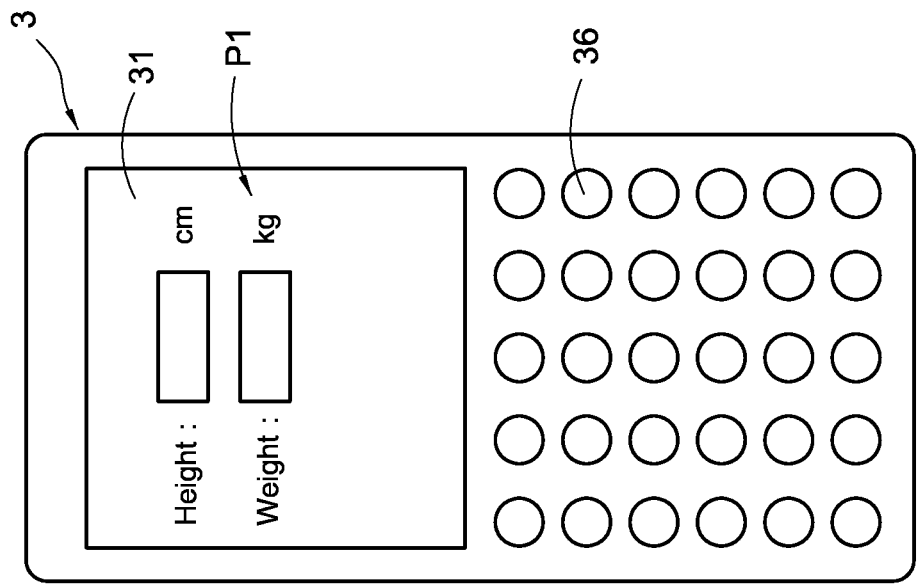
FIG. 4D illustrates the fourth embodiment of the data record sheet
Figure 4C:
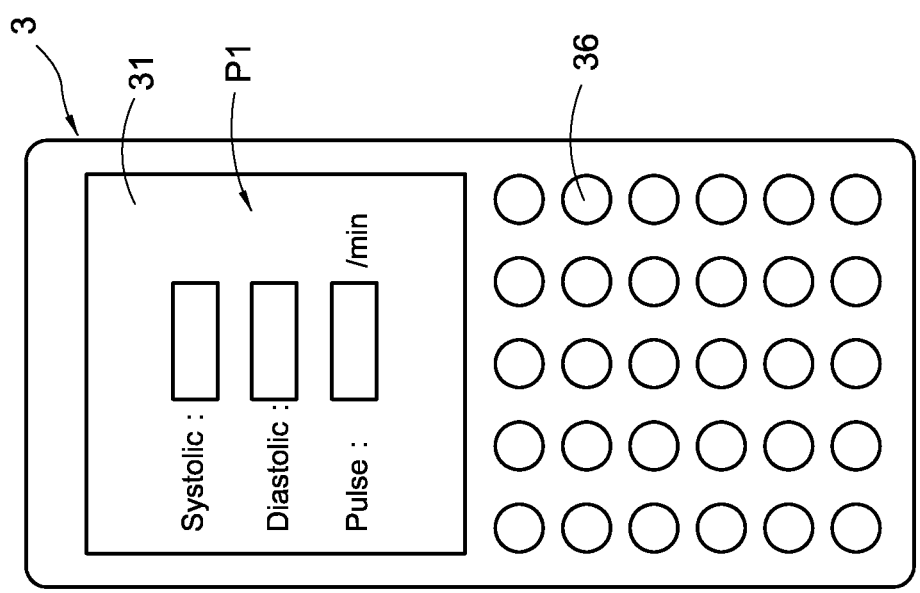
FIG. 4C illustrates the third embodiment of the data record sheet

Please refer to FIG. 4A, FIG. 4B, FIG. 4C, and FIG. 4D which illustrates the embodiment of the first to fourth embodiment of the data record sheet respectively. FIG. 4A illustrates that the electronic apparatus 3 can hold multiple data record sheets P1, e.g. body temperature, blood pressure, breath, blood sugar, blood oxygen, and body weight and height data record sheets, and these sheets can be shown on the display screen 31. FIG. 4B illustrates as the electronic apparatus 3 determines the external device 4 as a thermometer from the model code 62, the electronic apparatus 3 will open the thermometer data record sheet P1, obtains the data from the external device 4, and automatically fill in the corresponding data field of the thermometer data record sheet P1. FIG. 4C illustrates as the electronic apparatus 3 determines the external device 4 as a blood pressure machine from the model code 62, the electronic apparatus 3 will open the blood pressure data record sheet P1, obtains the data from the external device 4, and automatically fill in the corresponding data field of the blood pressure data record sheet P1. FIG. 4D illustrates as the electronic apparatus 3 determines the external device 4 as a body weight and height machine from the model code 62, the electronic apparatus 3 will open the body weight and height data record sheet P1, obtains the data from the external device 4, and automatically fill in the corresponding data field of the body weight and height data record sheet P1.

The benefit is the ability to categorize the data from different machines to avoid user confusion. For example, thermometer usually has only one value, whereas blood pressure machine has systolic, diastolic, and pulse pressure values. If all of the mentioned values are recorded on the same page, and while different data may have different units (ex. ° C. or kg), the user may enter the data in the wrong data field.

FIG. 5 illustrates an example when the external device 4 is a blood pressure machine and is used to measure the user's systolic, diastolic, and pulse pressure values. The electronic apparatus 3 will open the data record sheet P1 which is for blood pressure data and includes systolic, diastolic, and pulse pressure data fields. Once the electronic apparatus 3 obtains the mentioned data from external device 4, the microprocessor component 33 will automatically populate the corresponding data field in the data record sheet P1. This process will eliminate human intervention of data entry.

Figure 10:
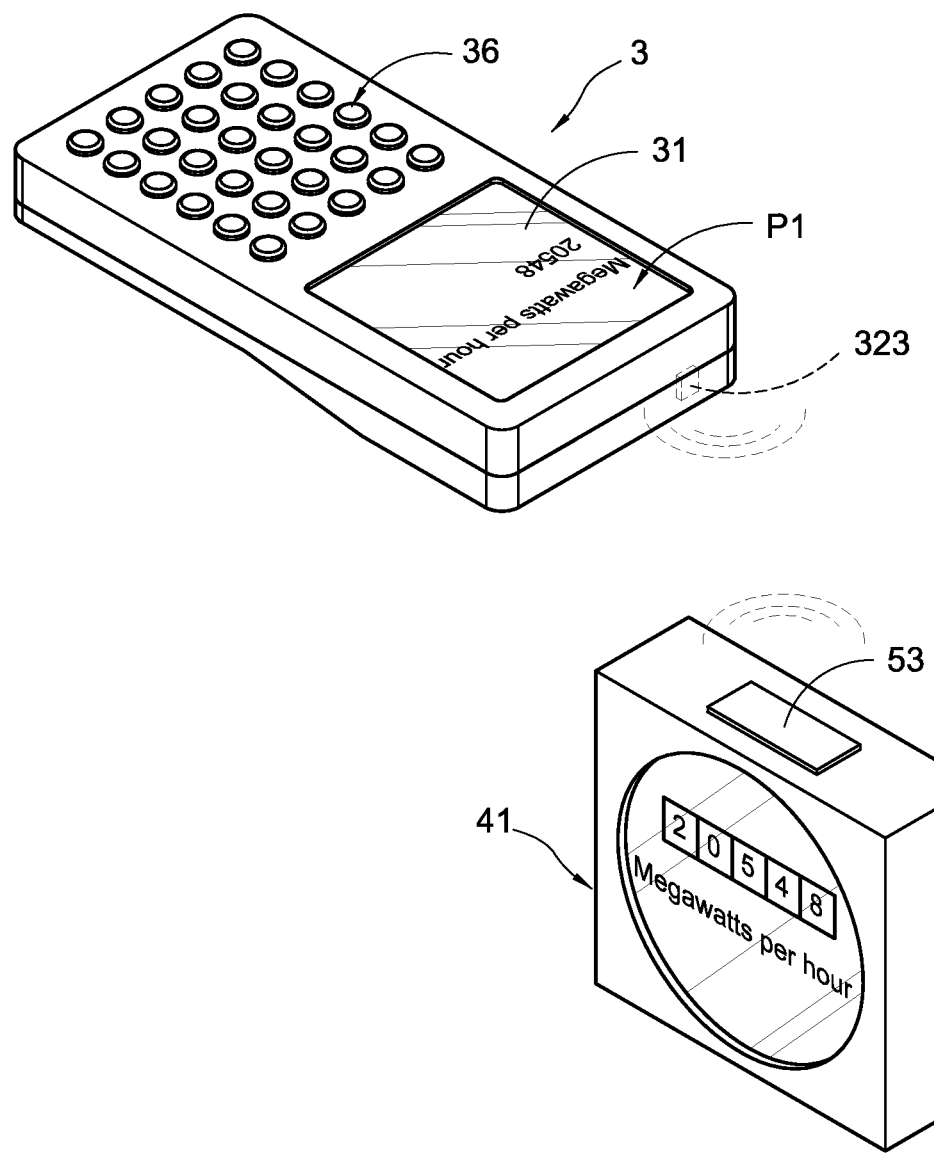
FIG. 10 illustrates the sixth embodiment of the external message obtaining process.

Other than the above mentioned example using the external device 4 as the blood pressure machine, FIG. 10 illustrates the sixth embodiment of external message obtainment process. This embodiment uses an electric meter as the an external device 41, the external device 41 has embedded Bluetooth transmitting component, ZigBee transmitting component, or WiFi transmitting component, etc. A RFID tag is attached to either the outer surface or placed internally of the external device 41 and the RFID tag contains the external message 53, which the external message 53 contains the MAC Address 61 of the external device 41. When an electrician needs to obtain data from the external device 41 (the electric meter), the electrician can use the electric apparatus 3 to easily retrieve the external message 53 from the external device 41 and record the data on the apparatus. The external device 41 can use barcode, text, graphic, QR code, or any other medium to record the external message 53. This embodiment uses the RFID tag as example and not limited thereof.

Figure 11:
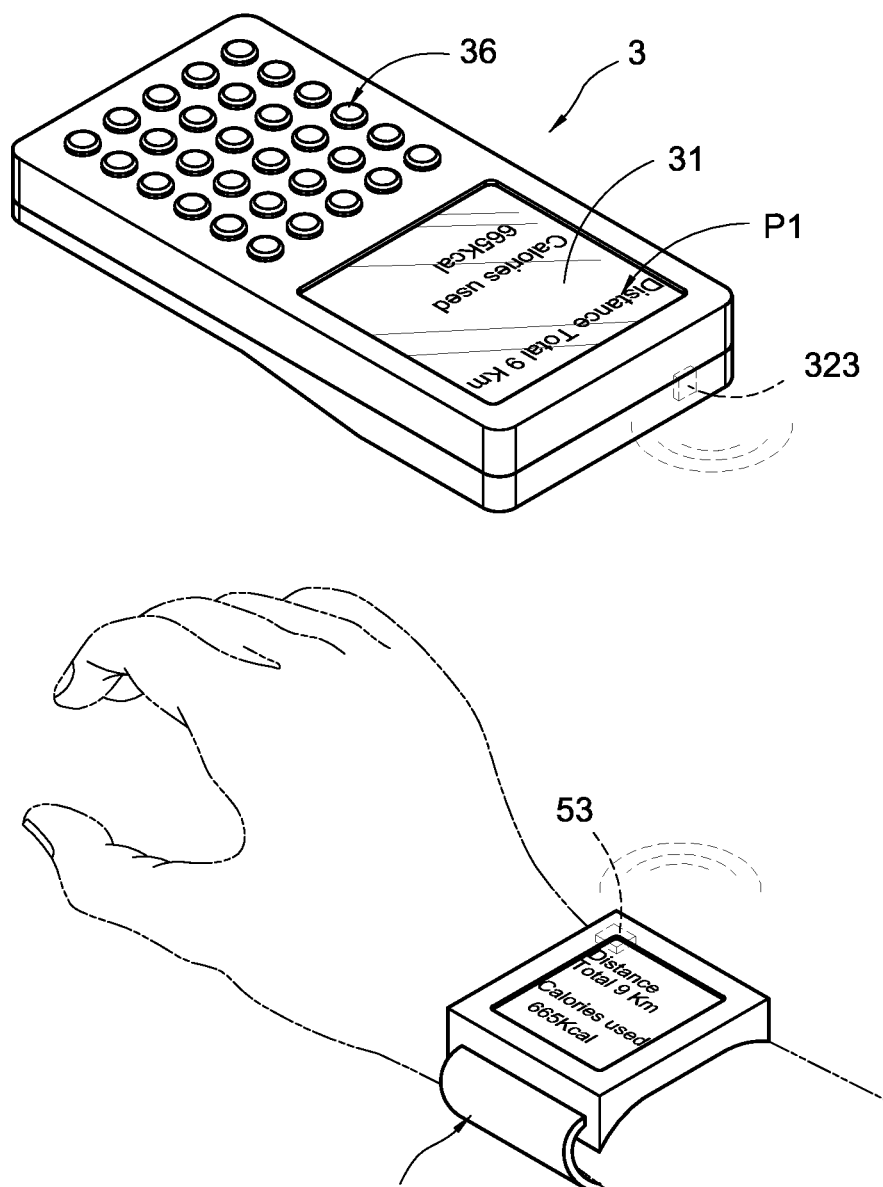
FIG. 11 illustrates the seventh embodiment of the external message obtaining process.

Please refer to FIG. 11 which illustrates the seventh embodiment of the external message obtainment. In this embodiment, a sports watch is used as an external device 42 and it has embedded Bluetooth transmitting component, ZigBee transmitting component or WiFi transmitting component, etc. A RFID tag is attached to either the outer surface or placed internally of the external device 42 and the RFID tag contains the external message 53. While the user is wearing the external device 42 and engaged in sporting activity, the external device 42 will record the activity, i.e. running distance, total calories exhausted, etc. Once the activity is completed and user wish to record the data from the external device 42, user can use the electronic apparatus 3 to read the RFID tag which contains the external message 53 by establishing a connection with the external device 42 and obtain the data record.

Figure 12:
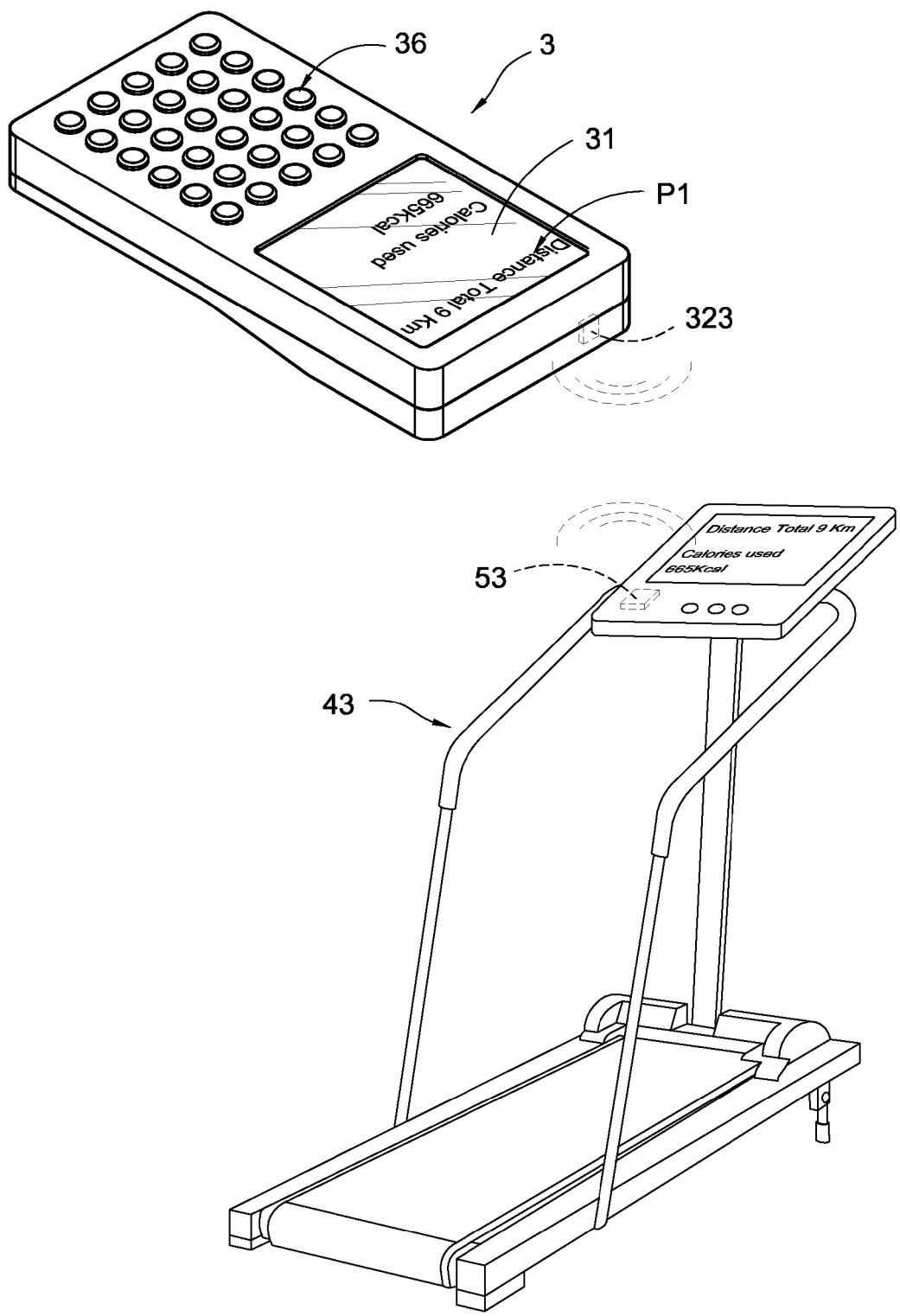
FIG. 12 illustrates the eighth embodiment of the external message obtaining process.

Lastly please refer to FIG. 12 which illustrates the eighth embodiment of the external message obtainment. In this example a treadmill is used as an external device 43 and it has embedded Bluetooth transmitting component, ZigBee transmitting component or WiFi transmitting component, etc. A RFID tag is attached to either the outer surface or placed internally of the external device 43 and the RFID tag contains the external message 53. While the user is using the external device 43, the external device 43 will record the activity, i.e. running distance, total calories exhausted, etc. Once the activity is completed and user wish to record the data from the external device 43, user can use the electronic apparatus 3 to read the RFID tag which contains the external message 53 by establishing a connection with the external device 43 and obtain the data record.

As shown by FIG. 5, the external message 51~56 mainly contains the specific device MAC Address 61, specific device model code 62, and a separation symbol 63. In this embodiment, the separation symbol 63 (example from the Figure shown as \*\*, or a space, or next line, etc.) can be used to separate the MAC Address 61 and the model code 62. More specifically, the first 12 codes (6 Bytes) of the default external message 51~56 on the electronic apparatus 3 can be the MAC Address 61, or separated by separation symbol 63 so the 12 codes before or 12 codes after the separation symbol 63 determined to be the MAC Address 61, but not limited thereof. By using the separation symbol 63, the electronic apparatus 3 can determine with high efficiency whether the external message 51~56 contains the MAC Address 61 of the external device 4.

Figure 3C:
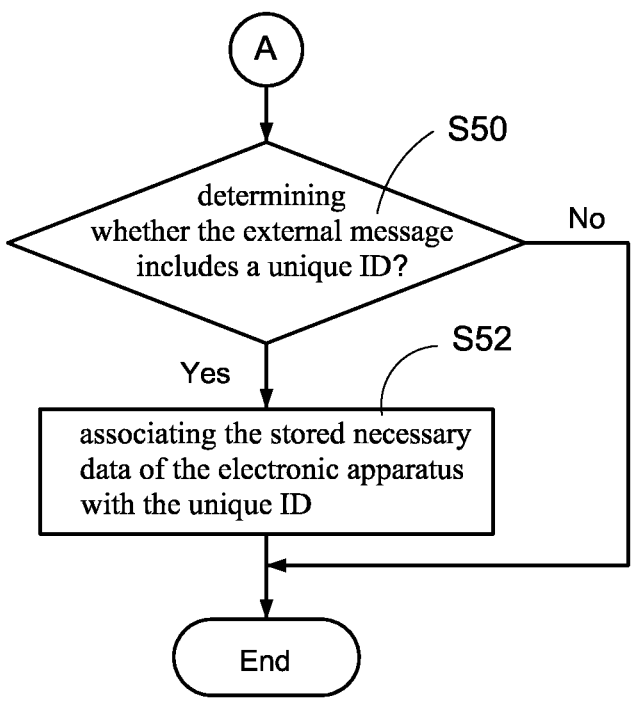
FIG. 3C illustrates the preferred embodiment of the data relation process.

Please refer to FIG. 3C, illustrating the embodiment of the data relation process. If at step S32, as shown in FIG. 3A, the electronic apparatus 3 determines that the external message 51 does not contain the MAC Address 61 of the external device 4 (e.g. the external message 51 is less than 12 codes or does not include the separation symbol 63), the electronic apparatus 3 needs to determine whether the external message 51 contains a unique ID 64 (step S50). If the external message 51 does not contain the MAC Address 61 of the external device 4 nor does it contain any unique ID 64, then the electronic apparatus 3 will not continue to process the external message 51; if the external message 51 contains the unique ID 64, then the stored data in the electronic apparatus 3 should be related to the unique ID 64 (step S52), hence the stored data should belong to the user of the unique ID 64.

For example, the unique ID 64 can represent a government issued tax ID, but not limited thereof. The electronic apparatus 3 can store one or more data simultaneously related to the unique ID 64, and these data belongs to the owner of the government issued tax ID (the unique ID 64).

Figure 13:
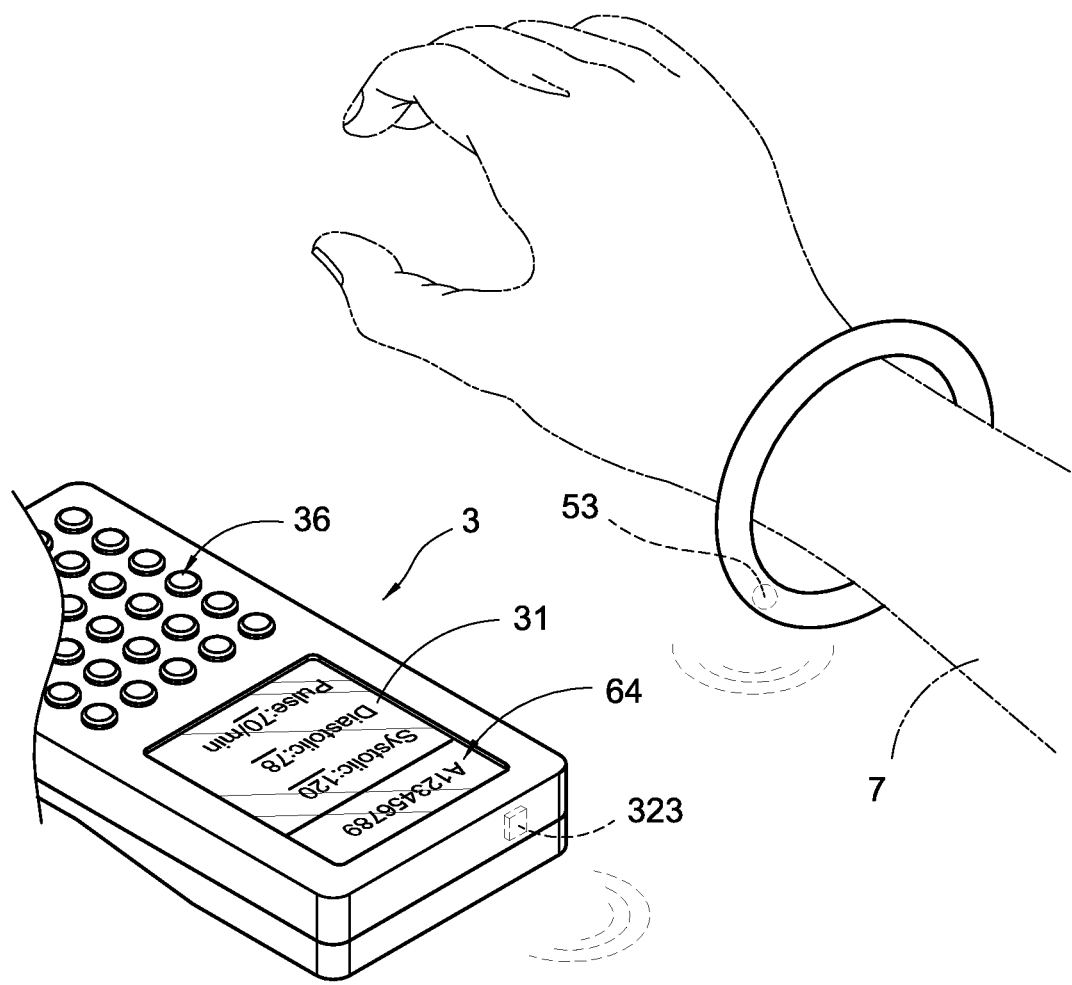
FIG. 13 illustrates the preferred embodiment of the unique ID obtainment.

Please refer to FIG. 13 illustrating the preferred embodiment of the unique ID obtainment. The electronic apparatus 3 obtains the data from the external device 4 (e.g. blood pressure machine) but it only knows the data is from the specific external device 4 but does not know which patient profile the data belongs to. Therefore the electronic apparatus 3 can proceed to obtain another external message (i.e. the external message 53 as shown in FIG. 10) to obtain the unique ID 64 from within this external message 53. The external message 53 can be stored in a RFID tag, a patient 7 can wear this tag and the unique ID 64 identifies the patient 7. When the electronic apparatus 3 obtains the unique ID 64 from the external message 53, the prior data from the external device 4 can be associated with the unique ID 64 (i.e. Systolic, diastolic, pulse pressure data) and makes association the data belongs to said patient 7.

Further, as shown in FIG. 2, the unique ID 64 can be pre-stored in the memory component 35 of the electronic apparatus 3, thus after the electronic apparatus 3 obtains the necessary data from the external device 4, the electronic apparatus 3 can provide at least one unique ID 64 for the user to choose from. When the user selects one of the unique ID 64, the electronic apparatus 3 will make an association between the obtained data and the selected unique ID 64. For example, if a nurse is caring for ten patients, the nurse can pre-record or download the unique ID 64 of the ten patients first onto the assigned electronic apparatus 3, then as the nurse uses the electronic apparatus 3 to obtain each patient's data, the data can be matched with the proper unique ID 64.

In another embodiment, the unique ID 64 can be used to identify a particular room or building, e.g. Ward room number or address, and not limited only to identify a person. For example, after the electronic apparatus 3 obtains the temperature reading from the thermometer of a ward room, the unique ID 64 of the room is obtained to make association between the ward room and the temperature reading, which will indicate the temperature reading of that particular ward room. Another example, after the electronic apparatus 3 obtains the electric meter reading of a building, the unique ID 64 of the building is obtained to make association between the building and the electric meter reading, which will indicate the electric meter usage of that particular building. The above mentioned examples only illustrates the embodiment of this invention, and not limited thereof.

Figure 3D:
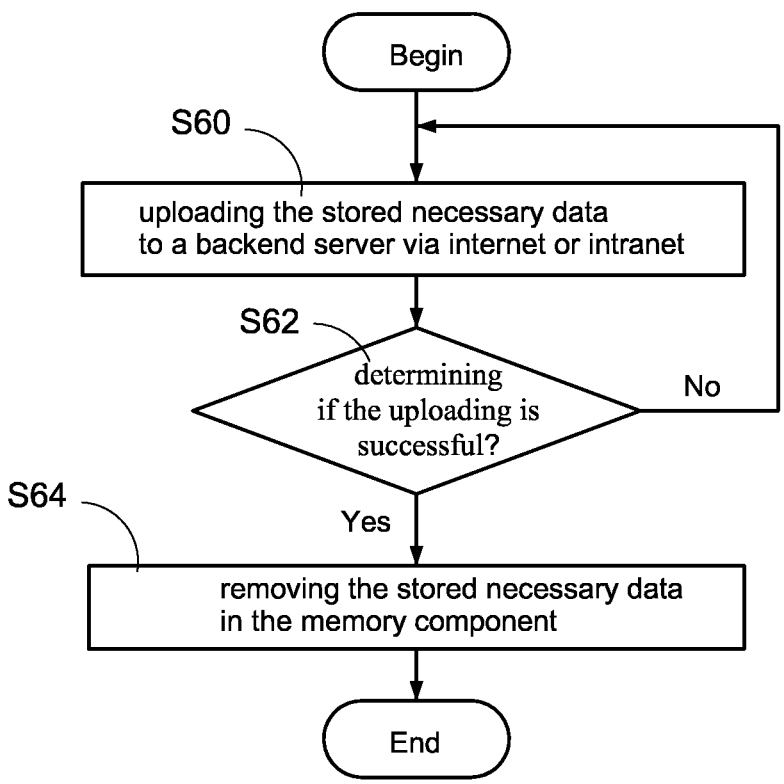
FIG. 3D illustrates the preferred embodiment of the data uploading process.

Lastly refer to FIG. 3D illustrating the embodiment of the data uploading process. After the electronic apparatus 3 obtains the data, it will temporarily store the data within the memory component 35 in electronic apparatus 3 then upload the data to a backend server on a periodic basis via internet or intranet (step S60). The electronic apparatus 3 will determine if the uploading is successful (step S62), if uploading was not successful, the data will still reside in the electronic apparatus 3 and will await for the next upload process; if the upload was successful, the electronic apparatus 3 will remove the temporarily stored data (step S64) to free up the memory component 35 within the electronic apparatus 3.

In the embodiment of this invention, the electronic apparatus 3 has the application program A1 installed within, the application program A1 has the executing program code for the electronic apparatus 3, thus once the electronic apparatus 3 loads the application program A1 and executes it, the electronic apparatus 3 can proceed with the above mentioned wireless obtainment of external data, automatically establish Bluetooth connectivity with the external device 4, and request for the necessary data from the external device 4. The following describes the steps involved for the electronic apparatus 3 in wireless obtainment of external data:

a) reading the external message 51 in non-physical contact manner; b) retrieving the MAC Address 61 of the external device 4 from the external message 51; c) proceeding automatically with Bluetooth pairing with the external device 4 and establishing Bluetooth connection via the MAC Address 61; d) retrieving the model code 62 of the external device 4 from the external message 51; e) determining the type of the external device 4 according to the model code 62; f) activating the corresponding communication protocol according to the type of the external device 4; g) requesting for the necessary data from the external device 4; h) opening the data record sheet P1 in accordance to the model code 62; and i) filling in the necessary data obtained from the external device 4 into the corresponding data fields in the opened data record sheet P1.

Hence the user is only required to press the control button 36 or the touch screen on the electronic apparatus 3 to initiate the non-contact data obtaining component 32 to obtain the external message 51, the electronic apparatus 3 can automatically complete the following actions: search for the external device 4, establish Bluetooth connection with the external device 4, obtain the necessary data from the external device 4 and fill in the data into the appropriate data record sheet P1 in the electronic apparatus 3.

Above mentioned are only examples for the embodiments of this invention and does not limit the scope of this invention. As stated, using any part or equivalent variations of this invention is considered within the scope of this invention.

What is claimed is:

1. A wireless obtaining method for an external data and used in an electronic apparatus, the wireless obtaining method comprising:
   a) reading an external message in non-physical contact manner;
   b) determining if the external message including a media access control (MAC) address of an external device;
   c) establishing a Bluetooth connection between the electronic apparatus and the external device through the MAC address if the external message includes the MAC address of the external device;
   d) requesting a necessary data from the external device after the Bluetooth connection is established, further including the following steps of:
      d1) obtaining a model code of the external device from the external message;
      d2) determining the type of the external device via the obtained model code; and
      d3) activating a corresponding communication protocol in accordance with the type of the external device and uses the communication protocol to communicate with the external device; and
   e) storing the necessary data from the external device temporarily in the electronic apparatus.

2. The wireless obtaining method of claim 1, wherein the step e further comprises following steps of:
   e1) opening a corresponding data record sheet in accordance with the type of the external device; and
   e2) filling the necessary data into a corresponding data field in the data record sheet to store temporarily.

3. The wireless obtaining method of claim 1, wherein the external message is barcode data comprising the MAC address and the model code of the external device, and in the step a, the electronic apparatus reads the barcode data through a barcode component of the electronic apparatus.

4. The wireless obtaining method of claim 1, wherein the external message is stored within a RFID tag and comprising the MAC address and the model code of the external device, and in the step a, the electronic apparatus obtains the external message by reading the RFID tag through a RF component of the electronic apparatus.

5. The wireless obtaining method of claim 1, wherein the external message is a text or a graphic image which comprising the MAC address and the model code of the external device, and the step a further comprises following steps of:
   a1) obtaining the external message through a camera component of the electronic apparatus;
   a2) decoding the text or the graphic image of the external message for obtaining the content within the external message.

6. The wireless obtaining method of claim 1, further comprises following steps of:
   f) providing at least one unique ID for selection on the electronic apparatus; and
   g) associating the stored necessary data of the electronic apparatus with the selected unique ID to indicate that the stored necessary data belongs to an owner of the unique ID.

7. The wireless obtaining method of claim 1, further comprises following steps of:
   h) if the external message does not include the MAC address of the external device, determining whether the external message includes a unique ID; and
   i) if the external message includes the unique ID, associating the stored necessary data of the electronic apparatus with the unique ID to indicate that the stored necessary data belongs to an owner of the unique ID.

8. The wireless obtaining method of claim 1, wherein the step c further comprises following steps of:
   c1) establishing Bluetooth pairing protocol with the external device automatically via the MAC address of the external device;
   c2) entering a PIN code of the external device automatically once the Bluetooth pairing protocol is initiated, wherein the PIN code is stored in the electronic apparatus; and
   c3) establishing the Bluetooth connection with the external device after the PIN code passes authentication.

9. The wireless obtaining method of claim 8, further comprises following steps before the step c:
   j) determining if a Bluetooth transmitting component of the electronic apparatus is activated; and
   k) activating the Bluetooth transmitting component after the step j if the Bluetooth transmitting component is not activated.

10. The wireless obtaining method of claim 1, further comprises following steps of:
    l) disconnecting the Bluetooth connection from the external device after the step e; and
    m) deactivating the Bluetooth transmitting component automatically.

11. The wireless obtaining method of claim 1, wherein the step e further comprises following steps of:
    e3) storing the necessary data temporarily in a memory component of the electronic apparatus;
    e4) uploading the stored necessary data to a backend server on a periodic basis via internet or intranet;
    e5) determining if the uploading is successful;
    e6) re-executing step e4 to step e5 if the uploading is unsuccessful; and
    e7) removing the stored necessary data in the memory component if the uploading is successful.

12. An electronic apparatus established a Bluetooth connection with an external device for requesting a necessary data from the external device, the electronic apparatus comprising:
    a microprocessor component;
    a non-contact data obtaining component electronically connected to the microprocessor component, and reading an external message in non-physical contact manner;
    a Bluetooth transmitting component electrically connected to the microprocessor component;
    wherein, the microprocessor component obtains a MAC address and a model code of the external device through the external message, and activates the Bluetooth transmitting component to open to establish the Bluetooth connection with the external device automatically via the MAC address, and determines the type of the external device via the model code, so as to request the necessary data from the external device through a corresponding communicating protocol in accordance with the type of the external device.

13. The electronic apparatus of claim 12, wherein the external message further comprises a separation symbol, and the microprocessor component separates the MAC address and the model code of the external message by using the separation symbol.

14. The electronic apparatus of claim 12, further comprises a memory component and a display screen which are electrically connected to the microprocessor component separately, the memory component stores at least one data record sheet, when the electronic apparatus obtaining the necessary data from the external device, the microprocessor component opens one of the data record sheet corresponding to the type of the external device, fill in the necessary data into a corresponding data field of the opened data record sheet and show on the display screen.

15. The electronic apparatus of claim 14, wherein the memory component stores a plurality of unique IDs, when one of the plurality of unique IDs is selected, the microprocessor component associates the necessary data with the selected unique ID to indicate that the necessary data belongs to an owner of the selected unique ID.

16. The electronic apparatus of claim 12, wherein the non-contact obtaining component is a barcode component, the external message is barcode data comprising the MAC address and the model code of the external device.

17. The electronic apparatus of claim 12, wherein the non-contact obtaining component is a radio frequency (RF) component, the external message is stored within a RFID tag and comprising the MAC address and the model code of the external device.

18. The electronic apparatus of claim 12, wherein the non-contact obtaining component is a camera component, the external message is a text or a graphic image which comprising the MAC address and the model code of the external device, the microprocessor component decoding the text or the graphic image of the external message for obtaining the MAC address and the model code within the external message.

19. An application program being stored in an electronic apparatus, and executing program code for the electronic apparatus, once the electronic apparatus loading and executing the application program, the electronic apparatus being able to proceed a wireless obtaining method for obtaining data from an external device wirelessly, and the wireless obtaining method comprising:
 a) reading an external message in non-physical contact manner;
 b) retrieving a MAC Address of the external device from the external message;
 c) proceeding automatically with Bluetooth pairing with the external device and establishing Bluetooth connection via the MAC Address;
 d) retrieving a model code of the external device from the external message;
 e) determining the type of the external device according to the model code;
 f) activating a corresponding communication protocol according to the type of the external device for communicating with the external device;
 g) requesting for a necessary data from the external device;
 h) opening a data record sheet in accordance to the type of the external device; and
 i) filling in the necessary data obtained from the external device into a corresponding data field in the opened data record sheet.

* * * * *